United States Patent [19]

Woody

[11] Patent Number: 5,681,514
[45] Date of Patent: Oct. 28, 1997

[54] METHOD FOR MAKING AN IMPLANTABLE CONDUCTIVE LEAD FOR USE WITH A CARDIAC STIMULATOR

[75] Inventor: Jim Woody, Brazoria, Tex.

[73] Assignee: Sulzer Intermedics Inc., Angleton, Tex.

[21] Appl. No.: 481,605

[22] Filed: Jun. 7, 1995

[51] Int. Cl.$^6$ .............................. B29C 47/06; B29C 47/88
[52] U.S. Cl. ...................... 264/104; 264/105; 264/173.12; 264/173.16
[58] Field of Search ...................... 264/104, 105, 264/171.15, 171.18, 173.11, 173.16, 173.12; 425/113, 114

[56] References Cited

U.S. PATENT DOCUMENTS

| | | | |
|---|---|---|---|
| 3,284,562 | 11/1966 | Stebleton . | |
| 3,769,085 | 10/1973 | Matsubara | 264/104 |
| 4,105,732 | 8/1978 | Slingluff | 264/104 |
| 4,109,648 | 8/1978 | Larke et al. | 128/206 |
| 4,198,991 | 4/1980 | Harris | 128/784 |
| 4,259,281 | 3/1981 | Lanfranconi et al. | 264/171.18 |
| 4,341,221 | 7/1982 | Testerman | 128/642 |
| 4,559,951 | 12/1985 | Dahl et al. | 128/642 |
| 4,658,836 | 4/1987 | Turner | 128/804 |
| 4,699,157 | 10/1987 | Shonk | 128/786 |
| 4,732,722 | 3/1988 | Aida et al. | 264/171.18 |
| 4,960,965 | 10/1990 | Redmon et al. | 174/102 R |
| 5,010,895 | 4/1991 | Maurer et al. | 128/788 |
| 5,036,210 | 7/1991 | Goodman | 264/105 |
| 5,330,520 | 7/1994 | Maddison et al. | 607/122 |
| 5,331,959 | 7/1994 | Imran | 128/639 |
| 5,518,681 | 5/1996 | Salzmann et al. | 425/114 |

*Primary Examiner*—Mathieu D. Vargot
*Attorney, Agent, or Firm*—Richard L. Robinson

[57] ABSTRACT

A method for making a lead body for use in a conductive insulated lead for a cardiac stimulator. Alternating layers of conductive and insulative thermosetting polymers are extruded through successively arranged heated nozzles of increasing outlet diameter. As the inner layer emerges from its nozzle in a thermoset state, it is passed through a following nozzle while surrounded by another thermosetting polymer that is extruded through that following nozzle. The second polymer becomes thermoset and bonded to the already thermoset inner layer. Successive nozzles can be provided to form successive layers of alternating conductive and insulative polymers, where the conductive layers serve as the electrical conductors of the lead.

8 Claims, 1 Drawing Sheet

METHOD FOR MAKING AN IMPLANTABLE CONDUCTIVE LEAD FOR USE WITH A CARDIAC STIMULATOR

BACKGROUND OF THE INVENTION

1. Field of the Invention

The present invention relates generally to implantable cardiac stimulators, and more particularly to implantable conductive leads for use with such cardiac stimulators to deliver electrical stimulus from the cardiac stimulator to cardiac tissue, or to conduct sensed electrical signals from cardiac tissue to the cardiac stimulator.

2. Background of the Art

Conductive leads used with cardiac stimulators usually include a connector at one end having one or more electrical contacts. The connector is mechanically and electrically connectable in a removable fashion to a mating connector integral with the cardiac stimulator. One or more electrodes are located at the other end of the lead, and perhaps at intermediate locations. Between the electrodes and the connector, the lead comprises one or more flexible elongate conductors protected and insulated from the patient's body tissues by a flexible, biocompatible insulative sheath. Where multiple conductors are employed, each conductor is insulated from the others. Typically, the conductor is a metal wire arranged as a closely wound helical coil. A single conductor may also be comprised of parallel multi-filar windings arranged collectively as a closely wound helical coil. Multiple conductors in a single lead can be arranged as coaxial helical coils of different diameters, or arranged as parallel windings in a single layer helical coil. The insulative sheath covering the conductor(s) is typically made of extruded polyurethane or silicone rubber, or other biocompatible elastomer.

SUMMARY OF THE INVENTION

The present invention involves a method of making a lead body having an insulated conductor for use in a conductive lead for a cardiac stimulator. In accordance with one aspect of the present invention, a method of making a lead body for use in a conductive insulated lead for a cardiac stimulator involves the following steps. A thermosetting insulative fluid material and a thermosetting conductive fluid material are provided, along with a first extruding nozzle having a first outlet, and a second extruding nozzle having a second outlet displaced axially from the first outlet. The second outlet has a diameter larger than that of the first outlet. One of the thermosetting fluid materials is extruded through the first outlet while simultaneously thermosetting that one thermosetting fluid material at the first outlet to form a first extruded thermoset material layer. The first thermoset material layer is passed through the second outlet while the other of the thermosetting fluid materials is extruded through the second outlet, and simultaneously thermosetting the other thermosetting fluid material to form a second extruded thermoset material layer overlying the first extruded thermoset material layer. As a result, a lead body is extruded having inner and outer layers, in which one of the layers is conductive and the other of the layers is insulative.

It is an object of the present invention to provide an improved method for making an implantable lead body for a conductive insulated lead for use with a cardiac stimulator.

Other objects and advantages of the present invention will be apparent to those of ordinary skill in the art from the following description of the preferred embodiments of and modes of carrying out the invention, made with reference to the attached figures.

DETAILED DESCRIPTION OF THE PREFERRED EMBODIMENTS

A preferred mode of carrying out the present invention involves making a lead body by extruding in a single continuous operation a lead body having multiple coaxial layers, including an outer layer that is an insulator and one or more inner layers each of which are conductors, with insulative layers disposed between the conductive layers.

Figure 1:
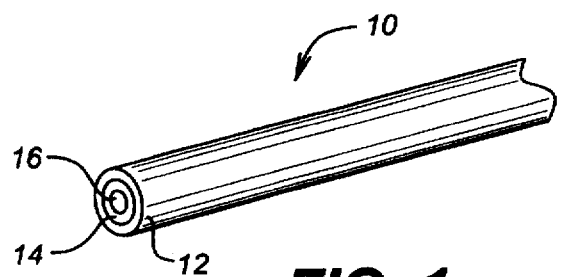
FIG. 1 is a perspective view of a lead body made in accordance with the present invention.

Referring to FIG. 1, there is illustrated a first embodiment of a lead body 10 made by the method of the present invention. Lead body 10 is generally round in cross-section, and includes an outer layer 12 that is annular in cross-section and made of a flexible, insulative, thermosetting polymer, preferably polyurethane. An inner layer 14 is located radially inwardly of outer layer 12 immediately adjacent thereto. Inner layer 14 is annular in cross-section, defining a central lumen 16 therethrough, and is made of a flexible, conductive, thermosetting polymer. Examples of conductive polymers are polymers filled with conductive particles such as carbon (graphite), silver, titanium or other metal powder or flakes, intrinsically conductive polymers, and polymers doped with iodine or bromine or alkali metals. Insulative polymers are well known.

Figure 2:
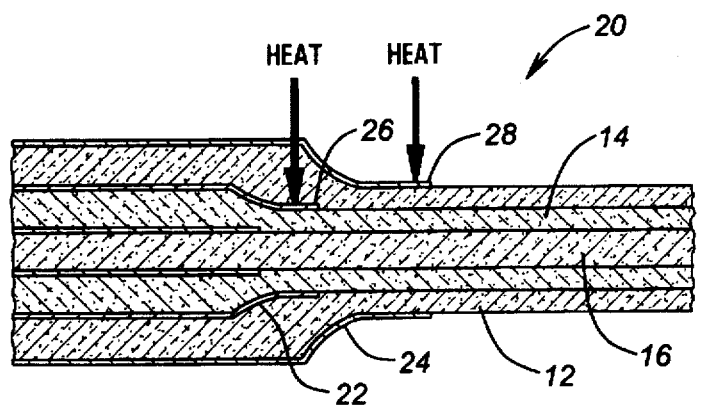
FIG. 2 illustrates schematically an apparatus for practicing the method of the present invention.

Referring to FIG. 2, an apparatus 20 for practicing the method of the present invention to make the embodiment of FIG. 1 is illustrated schematically. Generally, the method of the present invention involves extruding and thermosetting each alternating insulative and conductive layer of the lead body sequentially via coaxially arranged extruding nozzles 22 and 24 that are offset axially from one another, with the nozzle 22 that forms the innermost layer 14 having its outlet 26 located upstream from the outlet 28 of the nozzle 24 that forms the next adjacent layer 12, which in this embodiment is the outermost layer. It should be understood, however, that additional nozzles can be disposed downstream to form additional layers, if desired. The polymer that forms each layer is introduced into its respective nozzle in fluid form under controlled pressure. Each nozzle 22, 24 is heated at the inside of its outlet 26, 28 to cause thermosetting of the polymer emerging from its respective nozzle. The first polymer that emerges in a thermoset state from nozzle 22 is enveloped by a second polymer in a fluid state that will comprise the next layer 12 of the lead body 10. The thermoset inner layer 14, surrounded coaxially by fluid polymer, passes through the second extruding nozzle 24 downstream together with the second polymer. The outlet 28 of the second nozzle 24 has a diameter differing from the diameter of the outlet 26 of the first nozzle 22 by twice the thickness of the second layer to be formed. The second nozzle 24 is heated at the inside of its outlet 28 to cause thermosetting of the polymer comprising the second layer as it emerges from the second nozzle 24 together with the already thermoset inner layer 14. After exiting the second nozzle 24, the inner and outer layers 14 and 12 are set and bonded to each other. The process can be continued with subsequent nozzles for as many layers as are desired.

It should be understood that the general process of extruding thermosetting polymers through heated nozzles is well known and no detailed description of the general principles and apparatus involved is necessary for one of ordinary skill in the art. It should be recognized, however, that in the context of the present invention, it is important that the pressure and flow of each fluid polymer be controlled so that substantially the same velocity is obtained for all of the polymers as they emerge from their respective nozzles. That insures that the layers travel at the same speed as they are formed, preventing shear stresses and delamination at the layer interfaces.

Figure 3:
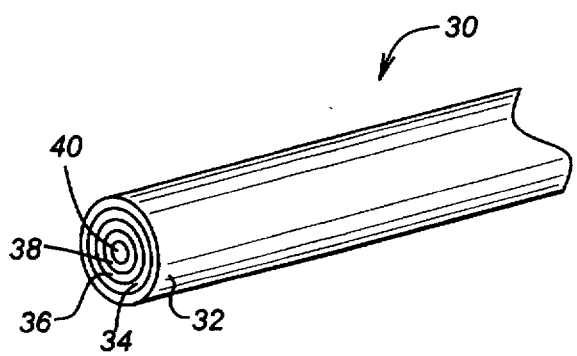
FIG. 3 is a perspective view of another embodiment of a lead body made in accordance with the present invention.

Referring to FIG. 3, there is illustrated a second embodiment of a lead body 30 made by the method of the present invention. Lead body 30 is generally round in cross-section, and includes an outer layer 32 that is annular in cross-section and made of a flexible, insulative, thermosetting polymer, preferably polyurethane. A first intermediate layer 34 is located radially inwardly of outer layer 32 immediately adjacent thereto. Intermediate layer 34 is annular in cross-section and made of a flexible, thermosetting polymer made conductive by doping with electrically conductive material. An second intermediate layer 36 is located radially inwardly of first intermediate layer 34 immediately adjacent thereto. Second intermediate layer 36 is annular in cross-section and made of a flexible, insulative, thermosetting polymer, preferably polyurethane. An inner layer 38 is located radially inwardly of second intermediate layer 36 immediately adjacent thereto. Inner layer 38 is annular in cross-section, defining a central lumen 40, and made of a flexible, thermosetting polymer made conductive by doping with electrically conductive material. It should be understood that the embodiment of FIG. 3 can be made using an apparatus and method similar to that described above with respect to the embodiment of FIG. 1, by merely adding additional nozzle stages, and introducing the appropriate fluid polymer, i.e., conductive or insulative, into the appropriate nozzle.

Figure 4:
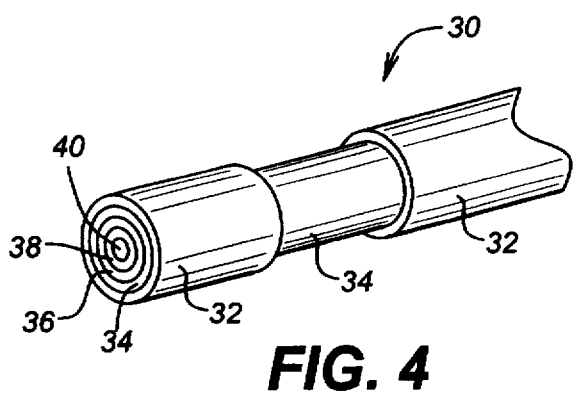
FIG. 4 is a perspective view of yet another embodiment of a lead body made in accordance with the present invention, showing one of the conductive layers exposed in part to form an electrode or electrical contact.

While it is contemplated that the lead body made by way of the method of the present invention would be used in combination with conventional connectors and electrodes, a variation of the method of the present invention permits electrodes and electrical contacts to be formed during the extruding process. For example, the embodiment of FIG. 3 could be altered to include a terminal electrode comprised of an exposed portion of the inner conductive layer 38 by controlling the extrusion of the various layers independently, i.e., delaying extrusion of layers 36, 34 and 32 until after a portion of thermoset inner layer 38 has passed through the nozzle at which layer 36 is formed, thereby leaving layer 38 exposed. Similarly, a ring electrode could be formed by interrupting the extrusion of layer 32 for a short time while continuing the extrusion of the other layers, thereby leaving a portion of conductive layer 34 exposed, as shown in FIG. 4. As an alternative, the exposed conductive layers just described could function as electrical contacts for connection to separate electrodes or electrical connectors.

While the present invention has been illustrated and described with particularity in terms of a preferred method and preferred embodiments, it should be understood that no limitation of the scope of the invention is intended thereby. For example, other combinations and permutations of insulative and conductive layers are possible, including but not limited to the formation of an insulated central lumen or no central lumen. The scope of the invention is defined only by the claims appended hereto. It should also be understood that variations of the particular embodiments described herein incorporating the principles of the present invention will occur to those of ordinary skill in the art and yet be within the scope of the appended claims.

What is claimed is:

1. A method of making a lead body for use in a conductive insulated lead for a cardiac stimulator, comprising the steps of:

providing a thermosetting insulative polymer;

providing a thermosetting conductive polymer;

providing a first extruding nozzle having a first outlet;

providing a second extruding nozzle having a second outlet displaced axially from said first outlet, said second outlet having a diameter larger than that of said first outlet;

extruding one of said thermosetting polymers through said first outlet while simultaneously thermosetting said one thermosetting polymer at said first outlet to form a first extruded thermoset polymer layer;

passing said first extruded thermoset polymer layer through said second outlet while extruding the other of said thermosetting polymers through said second outlet and simultaneously thermosetting said other thermosetting polymer to form a second extruded thermoset polymer layer overlying said first extruded thermoset polymer layer;

whereby a lead body is extruded having inner and outer layers, one of said layers being conductive and the other of said layers being insulative.

2. The method of claim 1, in which in said step of extruding one of said thermosetting polymers through said first outlet, said one of said thermosetting polymers is said thermosetting conductive polymer.

3. The method of claim 1, in which said step of thermosetting said one thermosetting polymer includes heating said polymer at said first outlet.

4. The method of claim 3, in which said step of thermosetting said other thermosetting polymer includes heating said polymer at said second outlet.

5. A method of making a lead body for use in a conductive insulated lead for a cardiac stimulator, comprising the steps of:

providing a first class of one or more thermosetting insulative polymers;

providing a second class of one or more thermosetting conductive polymers;

providing a first extruding nozzle having a first outlet;

providing a second extruding nozzle having a second outlet having a diameter larger than that of said first outlet;

providing a third extruding nozzle having a third outlet having a diameter larger than that of said second outlet;

extruding a first one of said thermosetting polymers through said first outlet while simultaneously thermosetting said first thermosetting polymer at said first outlet to form a first extruded thermoset polymer layer;

passing said first extruded thermoset polymer layer through said second outlet while extruding a second one of said thermosetting polymers through said second outlet and simultaneously thermosetting said second thermosetting polymer to form a second extruded thermoset polymer layer overlying said first extruded thermoset polymer layer;

passing said first and second extruded thermoset polymer layers through said third outlet while extruding a third one of said thermosetting polymers through said third outlet and simultaneously thermosetting said third thermosetting polymer to form a third extruded thermoset polymer layer overlying said second extruded thermoset polymer layer;

wherein said first one and said third one of said thermosetting polymers are both selected from one and only one of said provided first and second classes, and said second one of said thermosetting polymers is selected from one of said provided classes other than that class from which said first one and said third one of said thermosetting polymers is selected;

whereby a lead body is extruded having alternating conductive and insulative layers.

6. The method of claim 5, in which said first one and said third one of said thermosetting polymers are selected from said provided class of insulative thermosetting polymers.

7. The method of claim 5, in which said first one and said third one of said thermosetting polymers are selected from said provided class of conductive thermosetting polymers.

8. The method of claim 6, and further including the step of stopping extrusion of said third one of said thermosetting polymers for a period of time, thereby allowing a portion of said second extruded thermoset layer to remain exposed.

* * * * *